(No Model.)
F. S. KRETSINGER.
AGRICULTURAL FORK.
No. 445,621. Patented Feb. 3, 1891.
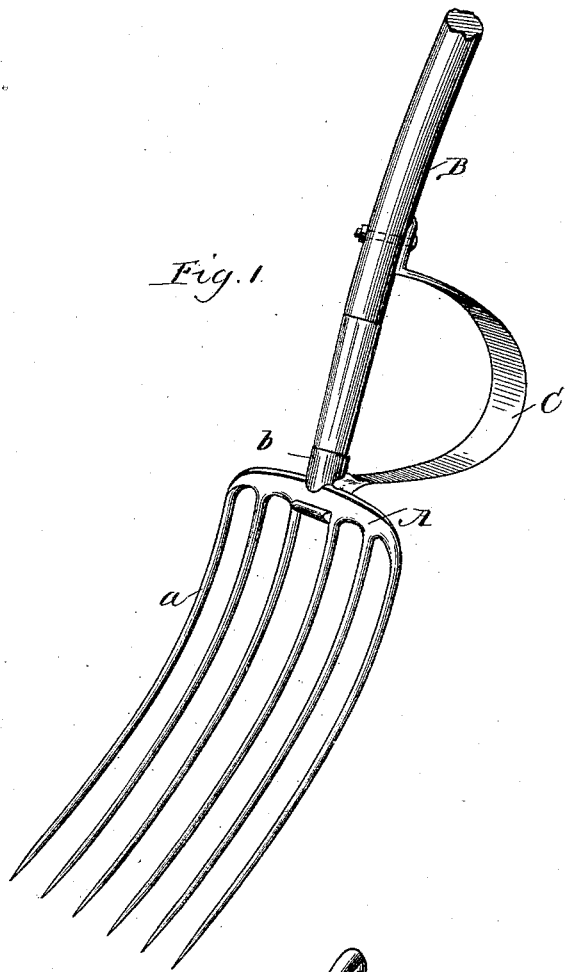
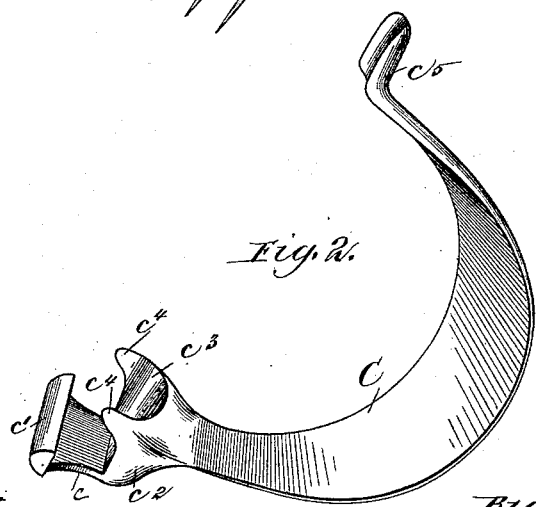

UNITED STATES PATENT OFFICE.

FREDERICK S. KRETSINGER, OF FORT MADISON, IOWA.

AGRICULTURAL FORK.

SPECIFICATION forming part of Letters Patent No. 445,621, dated February 3, 1891.

Application filed July 16, 1890. Serial No. 358,963. (No model.)

*To all whom it may concern:*

Be it known that I, FREDERICK S. KRETSINGER, a citizen of the United States, residing at Fort Madison, in the State of Iowa, have invented certain new and useful Improvements in Agricultural Forks, of which the following is hereby declared to be a full, clear, and exact description, reference being had to the accompanying drawings, forming part of this specification.

My present invention has for its object to provide forks—such, for example, as are used for digging and removing potatoes, and other purposes—with a fulcrum or brace whereby the fork may be much more easily and effectively handled.

To this end my invention consists in the novel construction of fulcrum or brace for forks hereinafter described, and particularly defined in the claims at the end of this specification.

Figure 1 is a perspective view showing the fork embodying my invention. Fig. 2 is a detail view of the fulcrum or brace detached.

A designates the head of the fork, from which project the tines $a$, in suitable number, this head having attached thereto the handle B, in usual or suitable manner. While the form of fulcrum or brace devised by me may be varied without departing from the spirit of my invention, I prefer to construct this fulcrum or brace of a plate C curved, as shown, and having its lower end attached to the head of the fork, while its upper end is braced against the fork-handle. In order to connect the lower end of the fulcrum or brace C with the fork-head, I prefer to provide this fulcrum with a clip adapted to engage the fork-head, this clip, by preference, consisting of a shank $c$, adapted to fit between the middle tines of the fork and having a head $c'$, the ends of which will project over the tines, and the upper edge of which will overlap the head A of the fork. The shank $c$ is connected with the fulcrum or brace C by the downwardly-extending portions $c^2$, and at the lower end of the fulcrum C is formed a socket $c^3$, with laterally-projecting lugs $c^4$, that fit about the ferrule $b$ at the lower end of the handle B. The curved fulcrum-plate C has its upper end provided with an angular portion $c^5$, preferably formed with a curved seat or socket to snugly fit against the handle B of the fork, and through this extension $c^5$ may be passed a suitable bolt or rivet for securely holding the fulcrum-plate upon the fork, or, if desired, a ferrule may be employed for this purpose.

From the foregoing description it will be seen that when my improved fulcrum-plate is to be attached to the fork, it is only necessary to slip the head $c'$ of the clip between the center tines of the fork, then turn the fulcrum-plate upward until the lugs $c^4$ fit about the ferrule $b$ and above the head A of the fork and the angular portion $c^5$ bears against the handle B. If the fork is used for digging, the fulcrum-plate C will bear upon the ground and serve as a fulcrum, while the handle B serves as a lever turning about such fulcrum to lift the load upon the tines $a$ of the fork.

While I do not wish my invention restricted to the particular shape of the fulcrum-plate C, I prefer to form this plate curved and broad, as shown, since I have found in practice that a very effective action of the fork is obtained by the use of such style of plate.

Having thus described my invention, what I claim as new, and desire to secure by Letters Patent, is—

1. A fulcrum-plate for forks, comprising a detachable plate C, curved in semicircular form so that its upper end shall bear against the fork-handle, and having its lower end furnished with a clip, the parts whereof shall bear upon all four sides of the fork-head to guard against the displacement of the clip, substantially as described.

2. A fulcrum-plate for forks, comprising a curved plate C, having its lower end provided with a shank $c$ and shank-head $c'$, adapted to engage with the fork-head, and provided also with lugs $c^4$, and having its upper end provided with an extension $c^5$ to bear against the fork-handle, substantially as described.

FREDERICK S. KRETSINGER.

Witnesses:
H. T. BRADISH,
T. T. HITCH.